United States Patent [19]

Nagano

[11] Patent Number: 4,861,320
[45] Date of Patent: Aug. 29, 1989

[54] POSITIONING DEVICE FOR A DERAILLEUR FOR A BICYCLE

[75] Inventor: Masashi Nagano, Izumi, Japan

[73] Assignee: Shimano Industrial Company Limited, Osaka, Japan

[21] Appl. No.: 147,512

[22] Filed: Jan. 25, 1988

[30] Foreign Application Priority Data

Jan. 28, 1987 [JP] Japan .............................. 62-11213[U]

[51] Int. Cl.⁴ .............................................. F16H 7/22
[52] U.S. Cl. ........................................ 474/80; 474/82
[58] Field of Search ................................... 474/80, 82

[56] References Cited

U.S. PATENT DOCUMENTS

| | | | |
|---|---|---|---|
| 4,132,119 | 1/1979 | Nagano et al. | 474/82 |
| 4,384,864 | 5/1983 | Bonnard | 474/82 |
| 4,437,848 | 3/1984 | Shimano | 474/82 |
| 4,507,101 | 3/1985 | Nagano | 474/82 |

FOREIGN PATENT DOCUMENTS

2657721  7/1977  Fed. Rep. of Germany .
2907741  8/1979  Fed. Rep. of Germany .
3300922  7/1984  Fed. Rep. of Germany .

*Primary Examiner*—Jerome W. Massie
*Assistant Examiner*—Matthew Smith
*Attorney, Agent, or Firm*—Stevens, Davis, Miller & Mosher

[57] ABSTRACT

A positioning device is provided for a bicycle derailleur, wherein a fixing member, having a bottom wall and a side wall, has a movable member movably supported thereto, with a plurality of engaging portions for setting the speed change stages of the bicycle being provided at one of the fixing member and the movable member and a retainer engageable with one of the engaging portions being provided at the other of the fixing member and the movable member. Connecting mechanisms are provided at the fixing member and movable member for connecting the positioning device to two members of the derailleur linkage mechanism which are movable relative to each other so that the positioning device is detachably mountable to the derailleur.

13 Claims, 5 Drawing Sheets

POSITIONING DEVICE FOR A DERAILLEUR FOR A BICYCLE

FIELD OF THE INVENTION

The present invention relates to a positioning device for a derailleur for a bicycle, and more particularly, to a positioning device for a derailleur for a bicycle, which is provided with a linkage mechanism deformable by operation of a control wire, thereby shifting a driving chain from one sprocket to another of a multistage sprocket assembly for changing the bicycle speed.

BACKGROUND OF THE INVENTION

A conventional derailleur for a bicycle uses a deformable linkage mechanism comprising four members: a base member, two linkage members, and a movable member, so that a control wire is operated to deform the linkage mechanism thereby changing the bicycle speed. In a case of setting the speed change stages, one of two members of the linkage mechanism, which are movable relative to each other, for example, one linkage member and the base member, is provided with a plurality of engaging portions to set the speed change stage and the other is provided with a retainer engageable with one engaging portion to thereby constitute a positioning mechanism.

In the conventional positioning mechanism, however, the engaging portions and retainer constituting the positioning device is provided directly on the members constituting the linkage mechanism, for example, the one linkage member and the base member, or is formed separately therefrom and fixed when the derailleur itself is being assembled. Accordingly, a problem arises in that the members carrying the engaging portions and retainer are complicated in construction and difficult to assemble.

Also, since the positioning mechanism is non-removably incorporated in the linkage mechanism, in order to provide users with a selection between a derailleur which, at the factory, has or has not been previously provided with a positioning mechanism, two different kinds of derailleurs must be produced. Also, when the multistage sprocket assembly has a different sprocket constitution, a derailleur having a positioning mechanism corresponding to the different sprocket constitution must be used.

SUMMARY OF THE INVENTION

An object of the present invention is to provide a positioning mechanism comprising a member having engaging portions and a retainer assembled in unitary fashion to be detachably mountable to the derailleur, in order to improve the efficiency of the assembly procedure simply so that the positioning device can be (1) simply applied to a derailleur originally having no positioning device, and (2) readily incorporated in a derailleur for use with a different sprocket constitution so as to always set a proper relationship between the control wire and the outer sheath therefor.

The positioning device of the invention is characterized by providing a fixing member having a bottom wall and a side wall rising therefrom, a moving member supported movably to the fixing member, a plurality of engaging portions provided at one of the fixing member and moving member so as to establish the speed change stages, a retainer provided at the other of the fixing member and moving member so as to engage with one of the engaging portions, first connection means for connecting the fixing member to one of two members of the derailleur linkage mechanism movable relative to each other when the linkage mechanism is deformed, and second connection means for connecting the moving member to the other of the two members of the linkage mechanism.

The positioning device comprising the fixing member and moving member can be completed as a unit independently of the derailleur assembly and connected to the linkage mechanism through the respective connection means to thereby be simply incorporated in the derailleur.

Accordingly, the positioning device of the invention first, has improved efficiency of assembly procedure, secondly, is easily removable from the linkage mechanism by releasing the connection means to easily modify the derailleur so as to not have a positioning device, and thirdly, enables selection from among several kinds of predetermined positioning devices having different numbers of positioning stages adapted to be mounted to the derailleur to thereby be usable corresponding to different numbers of sprockets at various types of multistage sprocket assemblies.

Also, the control wire is fixed to one of the fixing member and the moving member, and a holder for the outer sheath guiding the wire is provided at the other. Thus, the control wire and outer sheath are previously mountable on the positioning device before it is mounted to the derailleur, thereby enabling the incorporated parts to be reduced in number to that extent and the positional relationship between the control wire and the outer sheath to be set properly.

Other objects and aspects of the invention will be more fully apparent from the following detailed description of the various embodiments with reference to the accompanying drawings.

DETAILED DESCRIPTION OF THE PREFERRED EMBODIMENTS

Figure 6:
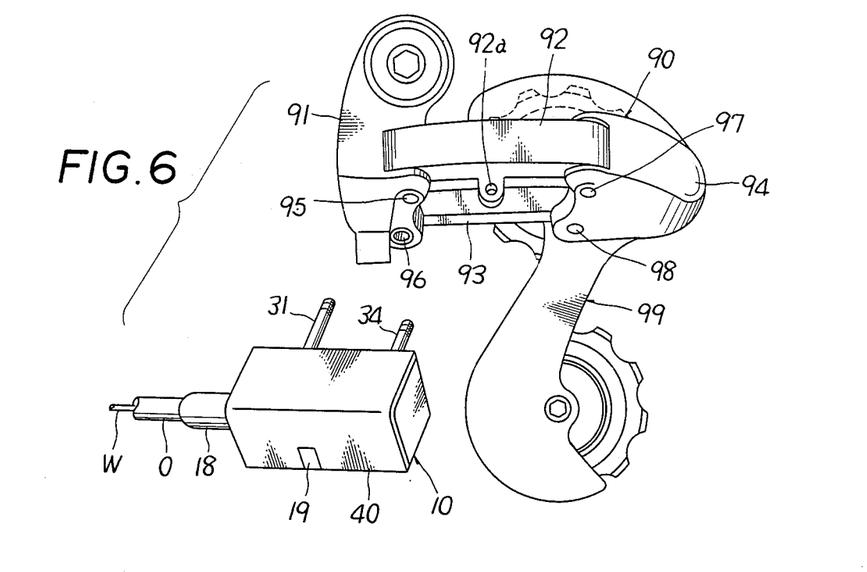
FIG. 6 is an illustration of the relationship between the positioning device of the invention and a derailleur.

A positioning device of the invention is applied to a derailleur for a bicycle as shown in FIG. 6. At first, the derailleur in FIG. 6 will be described in brief.

The well-known type of derailleur in FIG. 6 is modified as described below to be used with the present invention. Generally, the derailleur is provided with a linkage mechanism 90 comprising a base member 91, two linkage members 92 and 93 and a movable member 94 which are connected by four pivot pints 95, 96, 97 and 98, and with a chain guide 99, the linkage mechanism 90 being deformable by a control wire W for changing the bicycle speed.

Figure 1:
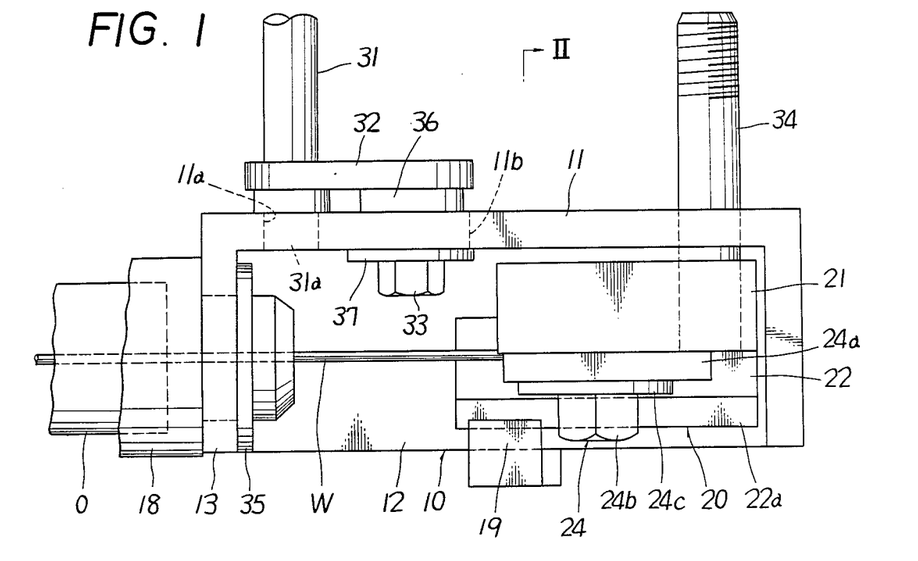
FIG. 1 is a plan view of a first embodiment of a positioning device of the invention.
Figures 2, 4, 5:
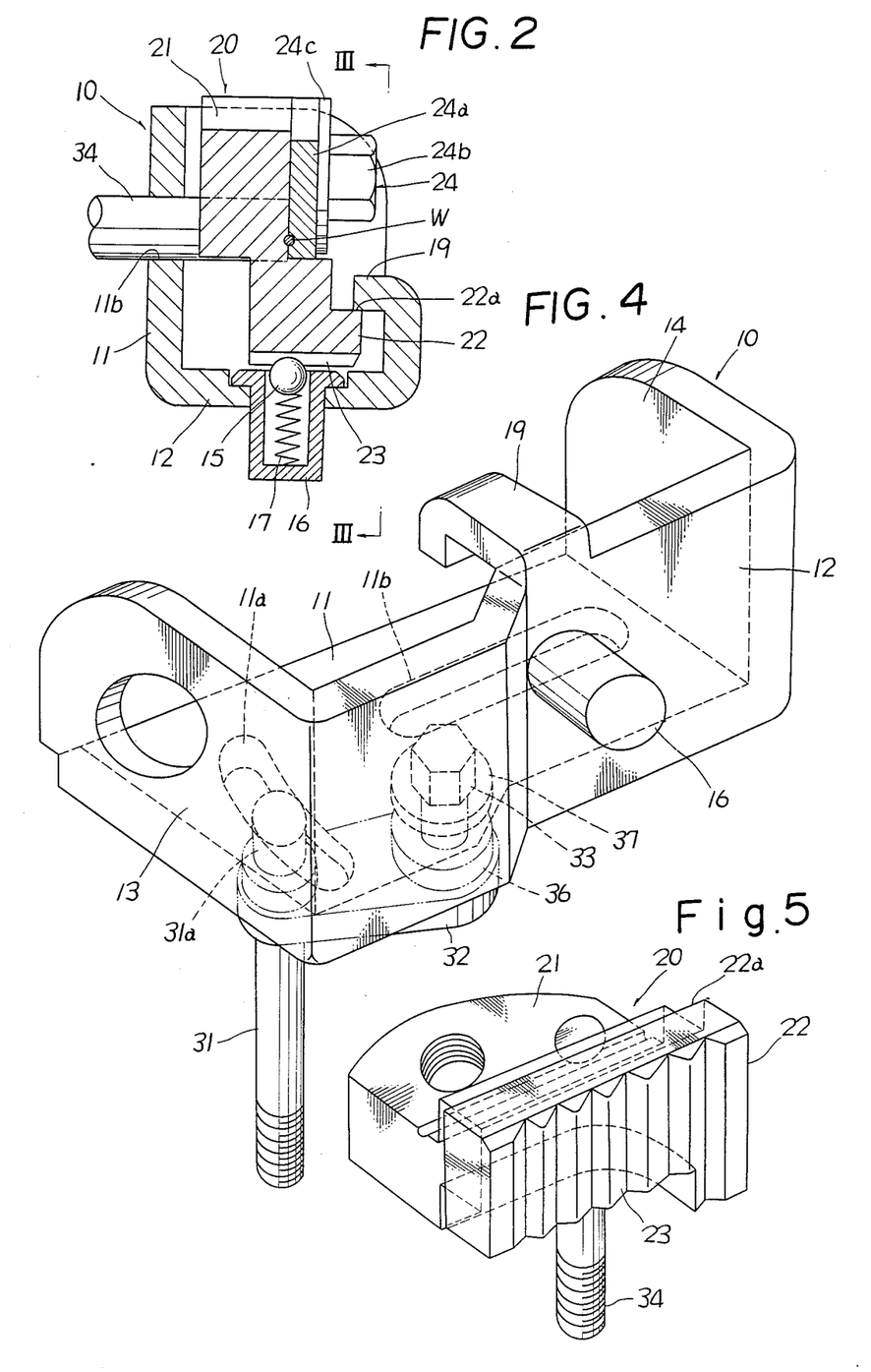
FIG. 2 is a sectional view taken on line II—II in FIG. 1.
FIG. 4 is a perspective view of a fixing member only.
FIG. 5 is a perspective view of a moving member only.
Figure 3:
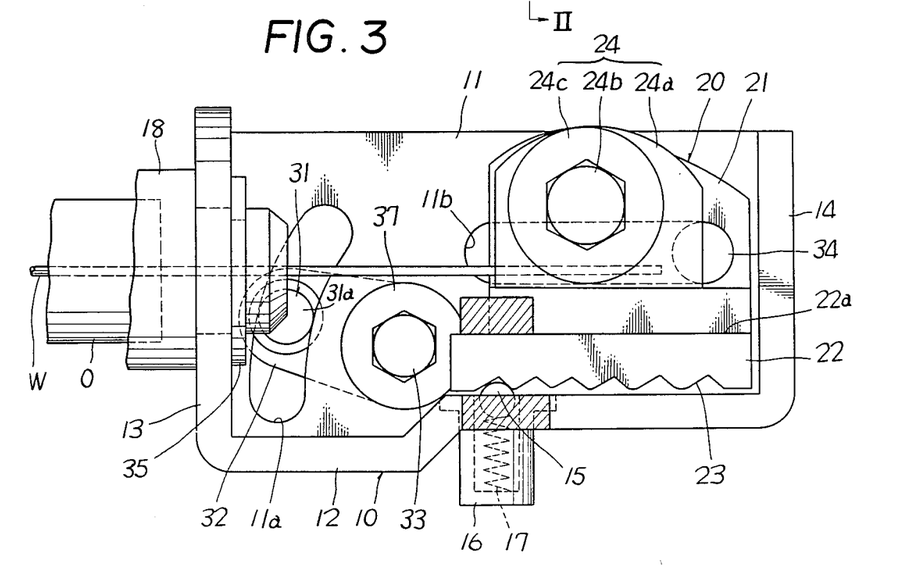
FIG. 3 is a sectional view taken on line III—III in FIG. 2.

FIGS. 1–3 show a first embodiment of the positioning device of the invention which is to be applied to the aforesaid derailleur of FIG. 6.

The positioning device basically comprises a fixing member or unit body 10 having a bottom wall 11 and a side wall 12, and a moving member 20 supported movably on fixing member 10.

Fixing member 10 in the first embodiment, as seen from FIG. 1, has side walls 13 and 14 in continuation of both left and right sides of side wall 12 and is formed in a substantially box shape open rearwardly and upwardly. On a substantially central portion thereof is mounted a ball retainer 15 through a tubular bottomed holder 16 and a spring 17, and on left side wall 13 is mounted a holder 18 for an outer sheath O guiding control wire W. At a substantially central portion of side wall 12 is provided a hooked guide 19 extending rearwardly from the upper surface of side wall 12 and bent at its utmost end toward bottom wall 11, and at bottom wall 11 are formed an elongate slot 11a having a circular arc shape and an elongate slot 11b, into which first and second connecting means to be described in detail below are inserted respectively, slot 11b extending in the direction in which moving member 20 is to be moved.

Moving member 20, as shown in FIG. 5, comprises a horizontal portion 21 opposite to bottom wall 11 and a vertical portion 22 rising from one widthwise end of horizontal portion 21, vertical portion 22 being opposite to the inner surface of side wall 12 at fixing member 10 and provided at the opposite surface with a plurality of engaging portions 23, retainer 15 and engaging portions 23 constituting a positioning mechanism. In addition, a fixture 24 for control wire W is provided at horizontal portion 21.

Engaging portions 23 are formed of crest-like juxtaposed ridges, so that retainer 15 engages with one engaging portion 23 to set and hold the position of a chain guide 99 (FIG. 6) with respect to a multistage sprocket assembly, that is, the speed change stage.

Rear surface 22a of vertical portion 22 is flat and the upper portion of vertical portion 22 is fitted to guide 19. Flat surface 22a slidably contacts the inner surface of guide 19, thereby guiding the moving member in a fixed direction.

Fixture 24 comprises an urging plate 24a for urging one end of wire W to horizontal portion 21 and a tightening bolt 24b for urging plate 24a to horizontal portion 21 through a washer 24c.

Fixing member 10 and moving member 20 are provided with first and second connecting means for connecting them to two members of the derailleur, for example, base member 91 and one linkage member 93 movable relative to each other at the linkage mechanism when deformed.

The first connecting means at fixing member 10 comprises a threaded shaft 31 mounted on the utmost end of an arm 32 which is mounted rotatably adjustably to bottom wall 11.

Arm 32 is supported rotatably adjustably to bottom wall 11 through an adjusting bolt 33 at a position spaced from the mounting position of threaded shaft 31, and is rotated to adjust the position of threaded bolt 31 at the utmost end of arm 32 with respect to fixing member 10. As a result, its distance from the second connecting means for moving member 20 can be changed, thereby enabling an amount of relative movement between fixing member 10 and movable member 20 corresponding to the pitch of engaging portions 23 to be changed.

In addition, utmost end portion 31a of threaded shaft 31 is fitted into elongate slot 11a having a circular arc configuration.

Also, the second connecting means provided at moving member 20 comprises a threaded shaft 34 fixed to horizontal portion 21, passing through elongate slot 11b provided at bottom wall 11, and projecting outwardly therefrom.

In addition, in FIGS. 1 through 3, a reference numeral 35 designates a snap ring for fixing outer sheath holder 18 to left side wall 13, and reference numerals 36 and 37 designate washers respectively.

The positioning device constructed as described above prior to being mounted on the derailleur, fixes control wire W to member 20 by fixture 24, and supports outer sheath O to outer sheath holder 18. A derailleur equipped with the positioning device, as shown in FIG. 6, for example, is modified according to the invention such that pivot pin 96 through which linkage member 93 is connected to base member 91, is made tubular, and a fitting bore 92a is provided at a lengthwise central portion of linkage member 92. Threaded shaft 31 of the first connecting means is inserted into pivot pin 96 and threaded shaft 34 of the second connecting means is inserted into fitting bore 92a, so that the utmost ends of threaded shafts 31 and 34 are locked by nuts or the like, thereby detachably mounting the positioning device to linkage mechanism 90 at the derailleur.

When the positioning device is mounted on the derailleur as described above, control wire W is pulled to move moving member 20 leftwardly in FIG. 1 with respect to fixing member 10, whereby threaded shaft 34, fixed to moving member 20, moves to swing linkage member 92, connected with shaft 34, and deforming linkage mechanism 90 to move chain guide 99 axially of the multistage sprocket assembly, thereby shifting the driving chain from one sprocket to another of the sprocket assembly.

When control wire W is pushed, moving member 20 moves rightwardly in FIG. 1 to deform linkage mechanism 90, thereby similarly shifting the chain.

In the above-described construction, since the positioning mechanism can be assembled independently of the derailleur comprising linkage mechanism 90 and chain guide 99, the assembly work at a factory and the dismantling and assembly work at the user side are easy to carry out. Also, the lock nuts can be removed so as to remove threaded shafts 31 and 34 from pivot pin 96 and fitting bore 92a, thereby enabling the derailleur to be simply changed so as to be used without the positioning device.

Also, many kinds of positioning devices different in number of engaging portions 23 or pitch can be formed, so that when the multistage sprocket assembly is different in sprocket constitution, the positioning device corresponding thereto can be mounted on the derailleur. Hence, there is no need that the derailleur be exchanged for a different derailleur since only the positioning device need be changed.

In addition, the positioning device in FIGS. 1 through 3, can expand its application range because threaded shaft 31 constituting the first connecting means is mounted rotatably with respect to fixing member 10 through arm 32 so as to adjust the position of threaded shaft 31 with respect to fixing member 10 corresponding to the position where the derailleur is disposed with respect to the multistage sprocket assembly, thereby enabling a distance between the positions of threaded shaft 31 and threaded shaft 34 constituting the second connecting means to be changed.

In addition, in the above-described embodiment retainer 15 is in the form of a ball, but alternatively the retainer may be substantially pawl-shaped, since the retainer is not particularly defined or limited in its construction.

Figure 7:
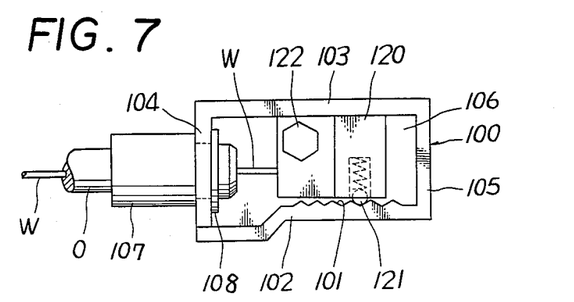
FIG. 7 is a plan view of a second embodiment of the invention.
Figure 8:
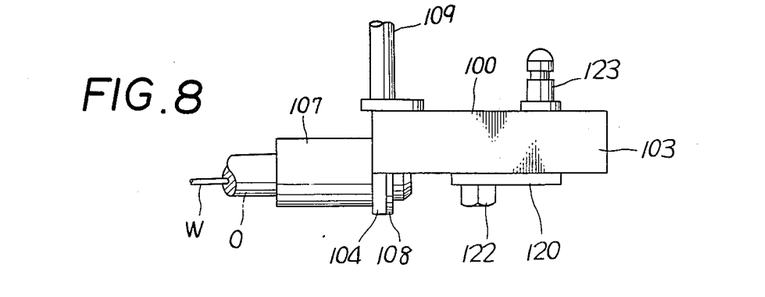
FIG. 8 is a side view of the FIG. 7 embodiment.

Next, explanation will be provided for a second embodiment of the invention with reference to FIGS. 7 and 8.

The second embodiment of the positioning device of the invention is provided at a fixing member 100 with a plurality of engaging portions 101 and at a moving member 120 with a retainer 121 engageable with one engaging portion 101.

Fixing member 100 is substantially box-shaped and provided with front and rear side walls 102 and 103, left and right side walls 104 and 105 and a bottom wall 106, engaging portions 101 being provided at front side wall 102, and rear side wall 103 serving as a guide surface for moving member 200.

In addition, in FIGS. 7 and 8, a reference numeral 122 designates a fixture for control wire W, 107 designates an outer sheath holder, 108 designates a snap ring for locking outer sheath holder 107, 109 designates a shaft provided at fixing member 100 and constituting a first connecting means, and 123 designates a shaft provided at moving member 120 and constituting a second connecting means.

Also, explanation will be provided for a third embodiment of the invention with reference to FIGS. 9 through 13.

Figure 9:
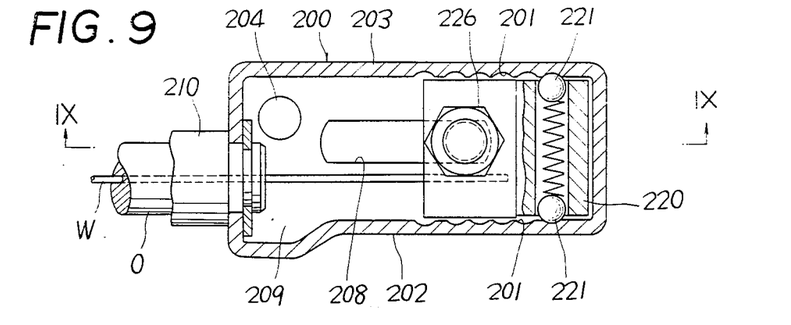
FIG. 9 is a longitudinal sectional view of a third embodiment of the invention.
Figure 10:
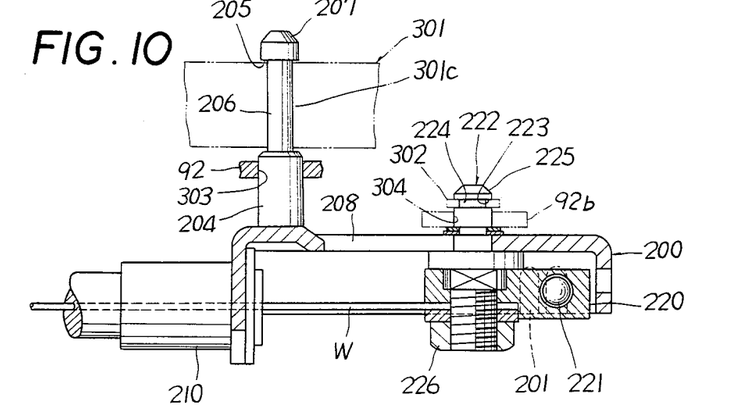
FIG. 10 is a sectional view taken on line X—X in FIG. 9.

The third embodiment, similarly to the second embodiment, is provided at a fixing member 200 with engaging portions 201 and at a moving member 220 with retainers 221, but is different in that engaging portions 201 are provided at the inner surfaces of the front and rear side walls 202 and 203 opposite to each other and a pair of retainers 221 are formed at moving member 220.

First and second connecting means provided at fixing member 200 and moving member 220 in the third embodiment use straight shafts 204 and 222, which have at their utmost ends retaining portions 205 and 223 respectively. The derailleur equipped with such positioning device is provided with first and second holding members 301 and 302 elastically shiftable and elastically engageable with retaining portions 205 and 223 respectively.

Figure 12:
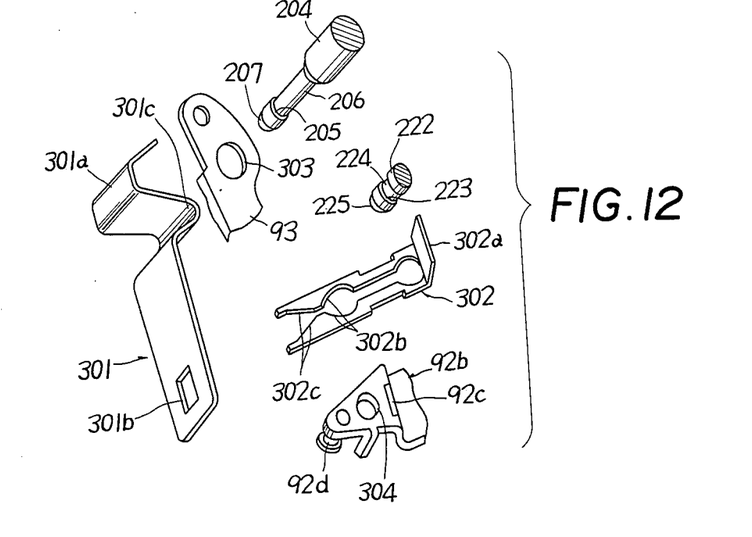
FIG. 12 is an illustration of the relationship between the shafts and holding members of the third embodiment.

In greater detail, retaining portions 205 and 223, as seen from FIG. 12, are composed of one-sided shoulders at annular grooves 206 and 224 formed at shafts 204 and 222 respectively. At the utmost ends of shafts 204 and 222 are provided tapered guides 207 and 225 tapered toward the tips of the shafts respectively.

At the derailleur are provided insertion bores 303 and 304 into which shafts 204 and 222 are insertable respectively. First holding member 301, as shown in FIG. 12, is formed of a strip-like leaf spring having one lengthwise end bent in a substantially S-like shape, at one end portion of which is provided an urging portion 301a and at the other end portion is provided a mounting bore 301b to be mounted to linkage member 93 at the derailleur. At an intermediate portion of first holding member 301 is provided a holding portion 301c engageable with retaining portion 205 and holding shaft 204. Holding member 301, as shown in FIG. 11, is fixed to linkage member 93 through mounting bore 301b.

Figure 11:
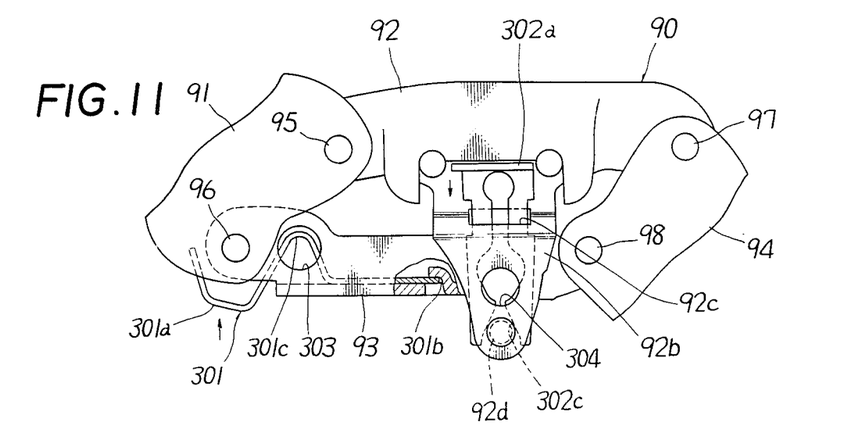
FIG. 11 is a partially cutaway plan view of the principal portion of the derailleur to which the third embodiment of the positioning device of the invention is applied.

On the other hand, second holding member 302, as shown in FIG. 11, is constructed such that a fork-like plate is raised at its root portion to form an urging portion 302a, the furcate portion is recessed in semicircular shape at the intermediate inside portions, with the recesses serving as holding portions 302b engageable with retaining portion 223 at shaft 222. At the utmost end portion of holding portion 302b is provided a guide portion 302c expanding outwardly and extending toward the utmost end, so that second holding member 302 is made elastically deformable at an intermediate portion between urging portion 302a and guide portion 302c.

Second holding member 302 is mounted on an arm 92b extending from linkage member 92, arm 92b being bent at an intermediate portion, with the bent portion being provided with a through bore 92c receiving therein second holding member 302. Holding member 302 is supported at the urging portion 302a side between the bent portion and an open end of linkage member 92 as shown in FIG. 11. At the utmost end of arm 92b is provided insertion bore 304, and at the utmost end of arm 92b beyond bore 304 is provided an engaging projection 92d which, when urging portion 302a is operated, engages with guide portions 302c to expand holding member 302 in diameter.

Also, holding portion 301c at first holding member 301 is positioned toward the center from the edge of insertion bore 303, so that when shaft 204 is inserted therein, holding portion 301c is adapted to retract outwardly of the bore edge of insertion bore 303 by guide 207.

Holding portion 302b at second holding member 302 is positioned toward the center from the bore edge of insertion bore 304, so that when shaft 222 is inserted therein, guide portion 225 is adapted to retract holding portion 302b outwardly from the edge of insertion bore 304.

The positioning device of the invention constructed as described above is simply mounted on linkage mechanism 90 at the derailleur by inserting shafts 204 and 222 of the first and second connecting means into insertion bores 303 and 304 at the derailleur.

When shafts 204 and 222 at the positioning device are inserted into insertion bores 303 and 304 respectively, utmost end guides 207 and 225 abut against the edges of holding portions 301c and 302b at holding members 301 and 302 to elastically deform the elastically deformable portions, whereby holding portions 301c and 302b retract and shafts 204 and 222 are inserted into insertion bores 303 and 304 a predetermined amount respectively. Hence, retaining portions 205 and 223 at shafts 204 and 222 are positioned corresponding to holding portions 301c and 302b and the elastically deformable portions at holding members 301 and 302 are elastically restored so that retaining portions 205 and 223 engage with holding portions 301c and 302b, thereby impeding shafts 204 and 222 from moving axially. Hence, the positioning device is readily and reliably mounted onto the derailleur by a simple operation of inserting shafts 204 and 222 into the respective insertion bores.

Also, the positioning device can be easily removed from the derailleur by pushing operating portions 301a and 302a in the direction of the arrows in FIG. 11 and shafts 204 and 222 are pulled out of insertion bores 303 and 304 respectively.

In addition, in FIGS. 9 through 13, reference numeral 208 designates a guiding slot provided at bottom wall 209 of fixing member 200 for guiding shaft 222, reference numeral 210 designates an outer sheath holder for receiving outer sheath O, and reference numeral 226 designates a fixture for fixing control wire W to moving member 220.

Figure 13:
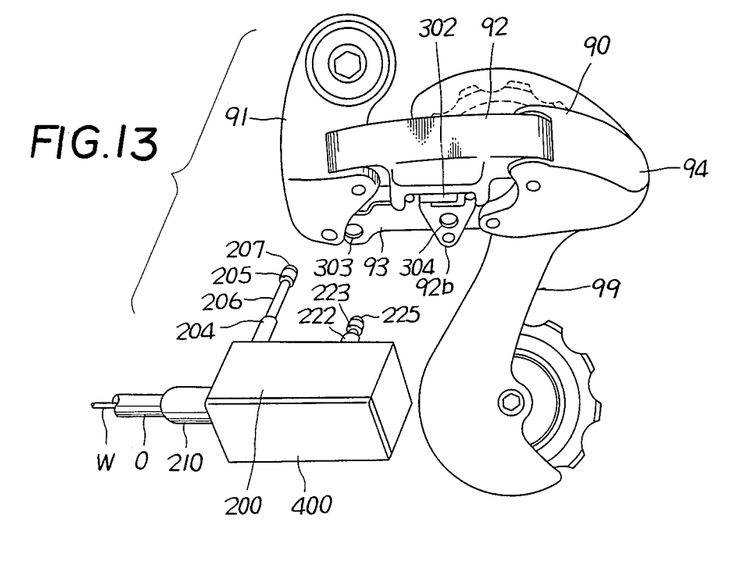
FIG. 13 is an illustration of a relationship between the third embodiment of the positioning device of the invention and the derailleur.

In FIGS. 6 and 13, reference numerals 40 and 400 designate covers for covering the openings of fixing members 10 and 200.

Alternatively, in the above embodiments, outer sheath holders 18, 106 and 210 may be provided at moving members 20, 120 and 220 and wire fixtures 24, 122 and 226 may be provided at fixing members 10, 100 and 200 respectively.

Alternatively, the connecting means comprising the above-described shafts may be mounted on linkage mechanism 90 at the derailleur and fixing members 10, 100 and 200 and moving members 20, 120 and 220 may be provided with insertion bores for receiving therein the shafts.

Alternatively, the fixing member and moving member may be connected to two members of the derailleur mechanism which are movable relative to each other, for example, base member 91 and linkage member 92 or 93, or movable member 94 and linkage member 92 or 93. In essence, the connecting means shafts need only be connected directly or indirectly to two relatively movable members of linkage mechanism 90.

The control wire W preferably uses a so-called push-pull type wire, but alternatively may use a pull-type wire.

As seen from the above, the present invention provides a positioning device which can be constructed independently of the derailleur having a linkage mechanism and chain guide, to facilitate assembly of the same at a factory and dismantling and assembly at the user side, thereby improving the efficiency of the assembly procedure.

Also, the positioning device is easily detachably mounted to the derailleur through the connecting means, so that the positioning device can be taken off from the derailleur to enable the derailleur to be simply changed to operate without the positioning device. Even when the sprocket constitution of the multistage sprocket assembly is changed, the positioning device can be replaced by another one corresponding to the new sprocket constitution without exchanging the derailleur. Furthermore, the control wire and outer sheath are always set in a proper positional relationship, thereby preventing an occurrence of an improper positional relationship therebetween.

Although several embodiments have been described, they are merely exemplary of the invention and not to be constructed as limiting, the invention being defined solely by the appended claims.

What is claimed is:

1. A positioning device for a bicycle derailleur which is provided with a linkage mechanism which is deformed by operation of a control wire for changing the bicycle speed, said positioning device comprising:
    (a) a fixing member having a bottom wall and a side wall rising therefrom, said fixing member further comprising one of a fixture for securing one end portion of said control wire and an outer sheath holder for holding an outer sheath guiding said control wire,
    (b) a moving member supported to said fixing member to be movable relative thereto, said moving member further including the other of said fixture and said outer sheath holder,
    (c) one of said fixing member and said moving member comprising a plurality of engaging portions for setting speed change stages of the bicycle,
    (d) the other of said fixing member and said moving member comprising a retainer selectively engageable with at least one of said engaging portions,
    (e) first coupling means for coupling said fixing member to one of two members at said linkage mechanism movable relative to each other when said linkage mechanism is deformed; and
    (f) second coupling means for coupling said moving member to the other of said two members.

2. A positioning device according to claim 1, wherein one of said fixing member and said moving member comprises a fixture for fixing one end of said control wire and the other of said fixing member and said moving member comprises an outer sheath holder for an outer sheath for guiding said control wire.

3. A positioning device according to claim 1, wherein said retainer is supported at said side wall of said fixing member, said moving member has a surface disposed opposite to said side wall and said surface comprises said engaging portions.

4. A positioning device according to claim 3, wherein said fixing member has a guide portion for guiding movement of said moving member relative thereto.

5. A positioning device according to claim 1, wherein said first connecting means comprises a first shaft and said second connecting means comprises a second shaft.

6. A positioning device for a bicycle derailleur which is provided with a linkage mechanism which is deformed by operation of a control wire for changing the bicycle speed, said positioning device comprising:
    (a) a fixing member having a bottom wall and a side wall rising therefrom,
    (b) a moving member supported to said fixing member to be movable relative thereto,
    (c) one of said fixing member and said moving member comprising a plurality of engaging portions for setting speed change stages of the bicycle,
    (d) the other of said fixing member and said moving member comprising a retainer selectively engageable with at least one of said engaging portions,
    (e) first coupling means for coupling said fixing member to one of two members at said linkage mechanism movable relative to each other when said linkage mechanism is deformed; and
    (f) second coupling means for coupling said moving member to the other of said two members,
wherein said first coupling means comprises a first shaft and said second coupling means comprises a second shaft, and wherein said fixing member has an arm supported rotatably adjustably at a position which is spaced apart from a mounting position of said first shaft, said first shaft being fixed to an utmost end of said arm, a position of said first shaft with respect to said fixing member being adjustable responsive to rotational adjustment of said arm.

7. A positioning device according to claim 5, wherein both said first and said second shaft are threaded shafts having screw threads.

8. A positioning device according to claim 5, wherein both said first shaft and said second shaft are straight shafts each having a retaining portion, the linkage mechanism of the derailleur comprising holding means elastically shiftable for elastically engaging with said retaining portion, whereby both said first shaft and said second shaft are detachably mounted to said linkage mechanism.

9. A positioning device according to claim 1, further comprising means for holding said retainer at said moving member, and wherein said engaging portions are provided at said fixing member.

10. A positioning device for a bicycle derailleur which is provided with a linkage mechanism which is deformed by operation of a control wire for changing the bicycle speed, said positioning device comprising:
   (a) a fixing member having a bottom wall and a side wall rising therefrom,
   (b) a moving member supported to said fixing member to be movable relative thereto,
   (c) one of said fixing member and said moving member comprising a plurality of engaging portions for setting speed change stages of the bicycle,
   (d) the other of said fixing member and said moving member comprising a retainer selectively engageable with at least one of said engaging portions,
   (e) first coupling means for coupling said fixing member to one of two members at said linkage mechanism movable relative to each other when said linkage mechanism is deformed;
   (f) second connecting means for connecting said moving member to the other of said two members,
   (g) means for holding said retainer at said moving member, wherein said engaging portions are provided at said fixing member, said fixing member has opposite side walls to form a substantially box-shaped fixing member, said engaging portions are formed at one of said opposite side walls, and the other of said side walls comprises a guide portion for guiding movement of said moving member relative to said fixing member.

11. A positioning device according to claim 9, wherein said fixing member has opposite side walls to form a substantially box-shaped fixing member, said engaging portions are formed at both said opposite side walls.

12. A positioning device according to claim 1, wherein said fixing member has a substantially box-shaped configuration, said moving member is housed in said fixing member and said fixing member includes a cover for closing an opening in said substantially box-shaped configuration of said fixing member.

13. A positioning device for a bicycle derailleur which is provided with a linkage mechanism which is deformed by operation of a control wire for changing the bicycle speed, said positioning device comprising:
   a fixing member having a bottom wall and a side wall rising therefrom;
   a moving member movable relative to said fixing member, said fixing member and said moving member being coupled together such that they are movable relative to each other,
   one of said fixing member and said moving member including a plurality of engaging portions for setting speed change stages of the bicycle;
   the other of said fixing member and said moving member including a retainer selectively engagable with said engaging portions, said fixing member and said moving member defining a positioning unit; and
   a coupling means for detachably coupling said positioning unit to the derailleur, said coupling means including a first coupling means for coupling said fixing member to one of two members at said linkage mechanism movable relative to each other when said linkage mechanism is deformed, and a second coupling means for coupling said moving member to the other of said two members at said linkage mechanism, at least one of said first coupling means and said second coupling means including a projecting member and a receiving member including a receiving portion for receiving therein said projecting member, one of said projecting member and said receiving member being coupled to one of said fixing member and said moving member and the other of said projecting member and said receiving member being adapted to be coupled to one of said two members at said linkage mechanism, said coupling means further comprising a holding means provided between said projecting member and said receiving member for enabling said projecting member to detachably engage with said receiving portion, said holding means including means for enabling said at least one of said first coupling means and said second coupling means to elastically shift in position when said projecting member is engaged with said receiving portion.

* * * * *